(12) United States Patent
Plafchan et al.

(10) Patent No.: US 11,348,377 B2
(45) Date of Patent: May 31, 2022

(54) VEHICLE ENTRY THROUGH ACCESS POINTS VIA MOBILE DEVICES

(71) Applicant: Ford Motor Company, Dearborn, MI (US)

(72) Inventors: Rachel Plafchan, Dearborn, MI (US); Joshua Finney, Birmingham, MI (US)

(73) Assignee: Ford Motor Company, Dearborn, MI (US)

( * ) Notice: Subject to any disclaimer, the term of this patent is extended or adjusted under 35 U.S.C. 154(b) by 402 days.

(21) Appl. No.: 16/475,974

(22) PCT Filed: Jan. 4, 2017

(86) PCT No.: PCT/US2017/012210
§ 371 (c)(1),
(2) Date: Jul. 3, 2019

(87) PCT Pub. No.: WO2018/128607
PCT Pub. Date: Jul. 12, 2018

(65) Prior Publication Data
US 2019/0355185 A1    Nov. 21, 2019

(51) Int. Cl.
| | | |
|---|---|---|
| *G06K 7/10* | (2006.01) | |
| *G07B 15/00* | (2011.01) | |
| *B60R 16/02* | (2006.01) | |
| *G06Q 20/32* | (2012.01) | |

(52) U.S. Cl.
CPC ......... *G07B 15/00* (2013.01); *G06K 7/10297* (2013.01); *B60R 16/02* (2013.01); *G06Q 20/3278* (2013.01)

(58) Field of Classification Search
CPC .. G06K 7/10297; G06Q 20/20; G06Q 20/202; G06Q 20/322; G06Q 20/327; G06Q 20/3278; G06Q 20/38; G07B 15/00
See application file for complete search history.

(56) References Cited

U.S. PATENT DOCUMENTS

| | | | | |
|---|---|---|---|---|
| 8,280,791 | B2 * | 10/2012 | Davis, III | G06Q 30/04 |
| | | | | 705/34 |
| 10,391,976 | B2 * | 8/2019 | Outwater | B60R 25/25 |
| 11,107,063 | B2 * | 8/2021 | Geist | G06Q 20/26 |
| 2010/0280956 | A1 * | 11/2010 | Chutorash | G06Q 20/20 |
| | | | | 705/64 |
| 2012/0284209 | A1 * | 11/2012 | Duffy | G08G 1/149 |
| | | | | 705/418 |

* cited by examiner

*Primary Examiner* — Thien M Le
*Assistant Examiner* — April A Taylor
(74) *Attorney, Agent, or Firm* — Brandon Hicks; Eversheds Sutherland (US) LLP (57) ABSTRACT

Method and apparatus are disclosed for vehicle entry through access point via mobile devices. An example vehicle includes a communication module to detect a first mobile device located in the vehicle, an RFID number determiner to identify a first RFID number associated with the first mobile device and a first RFID reader from an RFID database, and an RFID module to transmit the first RFID number to the first RFID reader to facilitate entry through a first access point.

20 Claims, 4 Drawing Sheets

FIG. 4

VEHICLE ENTRY THROUGH ACCESS POINTS VIA MOBILE DEVICES

TECHNICAL FIELD

The present disclosure generally relates to access points and, more specifically, vehicle entry through access points via mobile devices.

BACKGROUND

Oftentimes, drivers of vehicles are authorized to enter restricted areas. Radio frequency identification (RFID) communication has been utilized to enable the vehicle to enter a restricted area (a gated parking structure, a toll road, etc.). For example, an RFID transponder may be positioned within a cabin of a vehicle that communicates with an RFID receiver located at and/or near an access point to enable the vehicle to enter the restricted area via the access point. For example, RFID communication may be utilized to enable a vehicle to gain entry into a gated parking structure. In other instances, RFID communication may be utilized to enable an occupant (e.g., a driver) of the vehicle to electronically pay a toll without stopping at a toll booth.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for vehicle entry through access points via mobile devices. An example disclosed vehicle includes a communication module to detect a first mobile device located in the vehicle, an RFID number determiner to identify a first RFID number associated with the first mobile device and a first RFID reader from an RFID database, and an RFID module to transmit the first RFID number to the first RFID reader to facilitate entry through a first access point.

An example disclosed method for facilitating vehicle entry through access points via mobile devices includes detecting, via a communication module, a first mobile device located in a vehicle and identifying, via a processor, a first RFID number associated with the first mobile device and a first RFID reader from an RFID database, The example disclosed method also includes transmitting the first RFID number to the first RFID reader to facilitate entry through a first access point.

An example disclosed computer storage medium includes instructions which, when executed, cause a machine to detect, via a communication module, a first mobile device located in a vehicle and identify, via a processor, a first RFID number associated with the first mobile device and a first RFID reader from an RFID database. The instructions which, when executed, also cause the machine to transmit the first RFID number to the first RFID reader to facilitate entry through a first access point.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Oftentimes, drivers of vehicles are authorized to enter restricted areas. Radio frequency identification (RFID) communication has been utilized to enable the vehicle to enter a restricted area (a gated parking structure, a toll road, etc.). For example, an RFID transmitter may be positioned within a cabin of a vehicle that communicates with an RFID receiver located at and/or near an access point to enable the vehicle to enter the restricted area via the access point. For example, a vehicle may include an RFID transmitter to enable the vehicle to gain entry into a gated parking structure. Additionally or alternatively, the vehicle may include another RFID transmitter to enable an occupant (e.g., a driver) of the vehicle to electronically pay a toll without stopping at a toll booth.

Typically, the vehicle includes a dedicated RFID transmitter for each access point through which the vehicle may enter vian RFID communication. For example, one RFID transmitter within a cabin of the vehicle may facilitate entry into a garage at home, another RFID transmitter within the cabin of the vehicle may facilitate entry into a restricted parking garage at work, another RFID transmitter within the cabin of the vehicle may facilitate payment of a toll along a toll road, etc. In some instances, it potentially may be difficult for a driver and/or another occupant of a vehicle to keep track of each of the RFID transmitters in an organized manner. For example, it potentially may be difficult to position each of RFID transmitters within the vehicle (e.g., on a windshield, on a dashboard, etc.) such that the RFID transmitters are able to communicate with respective RFID receivers without obstructing a view of and/or without otherwise distracting the driver.

Further, in some instances, two or more RFID transmitters may be located within the vehicle that are each associated with the same RFID receiver. For example, a driver of the vehicle may have one RFID transmitter that facilitates payment of a toll along a toll road, and a passenger of the same vehicle may have another RFID transmitter that also facilitates payment of the same toll. In such instances, the occupants of the vehicle potentially may be charged twice (e.g., one charge paid via the RFID transmitter of the driver and another charge paid via the RFID transmitted of the passenger) as the vehicle passes a toll booth when only one payment is required.

Example apparatus, methods and computer readable media disclosed herein utilize an RFID module that transmits RFID signal(s) associated with a mobile device located within a vehicle to increase organization of RFID communication associated with a vehicle by reducing a number of RFID modules located within the vehicle. The examples disclosed herein enable the RFID module to transmit one or more of multiple different RFID numbers associated with the mobile device to different corresponding RFID readers so that one RFID module is utilized to facilitate entry through multiple different access points. Further, the examples disclosed herein enable the RFID module to transmit RFID numbers associated with different mobile devices located within the vehicle so that the RFID module facilitates entry through access points associated with different occupants within the vehicle. Further, the examples disclosed herein enable an occupant to select which RFID number(s) are transmitted via the RFID module to facilitate organization of RFID communication and/or to prevent multiple radio-frequency signals being simultaneously transmitted from within the vehicle to a single RFID reader.

Example vehicles disclosed herein include a communication module that detects mobile devices (e.g., smart phones, tablets, wearables, smart watches, etc.) located in a cabin of the vehicle. For example, the communication module detects a first mobile device located within the vehicle. Subsequently, an RFID number determiner queries an RFID database and identifies a first RFID number associated with the first mobile device and a first RFID reader from the RFID database. Further, an RFID module of the vehicle transmits the first RFID number to the first RFID reader to facilitate entry through a first access point.

As used herein, a "RFID module" includes at least one RFID tag that transmits radio-frequency signal(s) to an RFID reader. As used herein, a "RFID tag" is a transmitter and/or a transceiver that sends radio-frequency signals to an RFID reader. As used herein, a "RFID reader" is a receiver that receives radio-frequency signals from RFID tag(s) and/or RFID module(s). As used herein, a "RFID number" refers to a number that is associated with an RFID reader and another device (e.g., a mobile device, an RFID reader, an RFID tag) and is utilized as a key. For example, when the associated RFID reader receives the RFID number, the RFID reader performs an action associated with the other device (e.g., permits the other device entry into a restricted area). As used herein, a "restricted area" is an area in which access limited and/or regulated. For example, a restricted area may be accessed by a person with corresponding credentials (e.g., authorization to park in a gated parking structure) and/or who has paid a corresponding toll (e.g., paid to park in a gated parking structure). As used herein, an "access point" is a point at which a person, a vehicle, and/or a mobile device is able to enter a restricted area.

In some examples, the communication module detects multiple mobile devices (e.g., a first mobile device, a second mobile device, etc.), and the RFID number determiner presents a list of mobile devices detected by the communication module. For example, the vehicle may include a display that visually presents the list of mobile devices to occupant(s) of the vehicle. In some such examples, the display is a touch screen that receives a selection of one of the presented list of mobile devices from an occupant of the vehicle. Additionally or alternatively, the vehicle includes a speaker that audibly presents the list of mobile devices to the occupant(s) of the vehicle and a microphone that audibly receives a selection of one of the presented list of mobile devices.

In examples in which a second mobile device is selected by an occupant of the vehicle, the RFID number determiner identifies a second RFID number from the RFID database. For example, the second RFID number is associated with the second mobile device and a second RFID reader different than the first RFID reader. In such examples, the RFID module transmits the second RFID number to the second RFID reader to facilitate entry through a second access point different than the first access point.

In other examples, the RFID number determiner identifies a third RFID number from the RFID database. For example, the third RFID number is associated with the first mobile device and the second RFID reader and/or any other RFID reader different than the first RFID reader. In such examples, the RFID number determiner presents (e.g., via the display and/or the speaker) a list of RFID numbers associated with the first mobile device (e.g., including the first RFID number and the second RFID number) and receives a selection of at least one of the list of RFID numbers from an occupant of the vehicle. In response to the occupant selection the third RFID number, the RFID module transmits the third RFID number to the second RFID reader to facilitate entry into a second access point different than the first access point.

In some examples, the RFID module includes a first RFID tag that transmits the first RFID number to the first RFID reader. In examples in which the RFID number determiner identifies multiple RFID numbers (e.g., the first RFID number, the second RFID number) the first RFID tag selectably transitions between transmitting the first RFID number to facilitate entry through the first access point and transmitting the third RFID number to facilitate entry through the second access point. That is, the RFID number determiner enables an occupant of the vehicle to select the first RFID number or the third RFID number to be transmitted by the first RFID tag. For example, the RFID number transmitted by the RFID tag changes based on the access point through which the vehicle is attempting to enter and/or based on which mobile device is located within the cabin of the vehicle.

Additionally, in some examples, the RFID module includes multiple RFID tags (e.g., a first RFID tag, a second RFID tag, etc.). For example, the RFID module may includes a first RFID tag that is selected to transmit the first RFID number and a second RFID tag that is selected to transmit the second RFID number. The RFID numbers selected to be transmitted by the RFID tags are associated with different mobile devices and/or different RFID readers. For example, the first RFID number transmitted by the first RFID tag and the second RFID number transmitted by the second RFID tag facilitate entry through different access points (e.g., the first access point and the second access point, respectively). Additionally or alternatively, the first RFID number transmitted by the first RFID tag and the second RFID number transmitted by the second RFID tag facilitate entry by different mobile devices (e.g., the first mobile device and the second mobile device, respectively).

Figure 1:
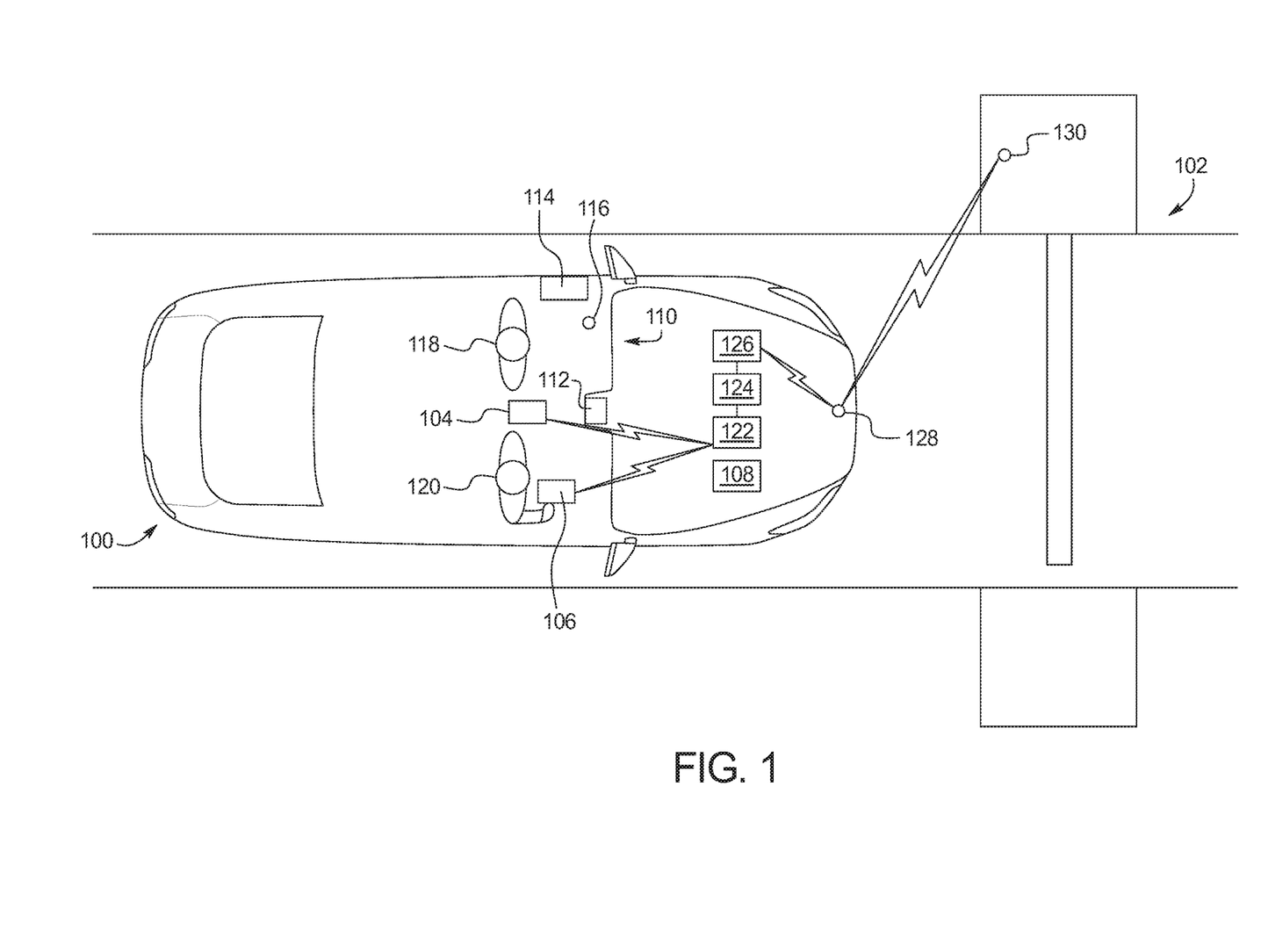
FIG. 1 illustrates an example vehicle in accordance with the teachings herein.

Turning to the figures, FIG. 1 illustrates an example vehicle 100 that gains entry through access points (e.g., an access point 102) via mobile devices (e.g., mobile devices 104, 106) in accordance with the teachings herein. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input). In the illustrated example, the vehicle 100 includes a global positioning system (GPS) receiver 108. For example, the GPS receiver 108 receives a signal from a global positioning system to monitor a location of the vehicle 100.

Further, the vehicle 100 of the illustrated example includes an infotainment head unit 110 that provides an interface between the vehicle 100 and a user. The infotainment head unit 110 includes digital and/or analog interfaces (e.g., input devices and output devices) to receive input from and display information for the user(s). The input devices include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display (LCD), an organic light emitting diode (OLED) display, a flat panel display, a solid state display, etc.), and/or speakers. In the illustrated example, the infotainment head unit 110 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). Additionally, the infotainment head unit 110 displays the infotainment system on, for example, the center console display.

In the illustrated example, the infotainment head unit 110 includes a display 112 (e.g., a center console display) and a speaker 114. For example, the display 112 presents visual output information to occupant(s) (e.g., the driver 118 and/or the passenger 120) of the vehicle 100, and the speaker 114 presents audio output information to the occupant(s) of the vehicle 100. In some examples, the display 112 is a touch screen to enable the driver 118 and/or the passenger 120 to provide input information via the display 112. Further, in the illustrated example, the vehicle 100 includes a microphone 116 that enables the driver 118 and/or the passenger 120 to provide input information audibly.

As illustrated in FIG. 1, a driver 118 (e.g., a first occupant) and a passenger 120 (e.g., a second occupant) are located in the vehicle 100. The driver 118 has the mobile device 104 (e.g., a first mobile device), and the passenger 120 has the mobile device 106 (e.g., a second mobile device). In the illustrated example, the mobile device 104 of the driver 118 and/or mobile device 106 of the passenger 120 is utilized to enable the vehicle enter a restricted area through the access point 102. For example, the mobile device 104 and/or the mobile device 106 facilitates entry through a toll booth, into a gated parking structure, etc.

Further, the vehicle 100 of the illustrated example includes a communication module 122 (e.g., a first communication module of the vehicle 100), an RFID number determiner 124 communicatively coupled of the communication module 122, another communication module 126 (e.g., a second communication module of the vehicle 100) communicatively coupled to the RFID number determiner 124, and an RFID module 128.

The communication module 122 detects whether and identifies which mobile devices are located within a cabin of the vehicle 100. In the illustrated example, the communication module 122 detects that the mobile device 104 of the driver 118 and the mobile device 106 of the passenger 120 are located in the cabin of the vehicle 100. For example, the communication module 122 is a short-range wireless module that includes hardware and firmware to establish a connection with the mobile devices 104, 106. In some examples, the short-range wireless module implements the Bluetooth® and/or Bluetooth® Low Energy (BLE) protocols. The Bluetooth® and BLE protocols are set forth in Volume 6 of the Bluetooth® Specification 4.0 (and subsequent revisions) maintained by the Bluetooth® Special Interest Group. In the illustrated example, the vehicle 100 includes one communication module (e.g., the communication module 122) that detects mobile devices. In other examples, the vehicle 100 may include a plurality of communication modules that are to detect whether and identify which mobile devices are located within the cabin of the vehicle 100.

The RFID number determiner 124 identifies RFID number(s) that are associated with the mobile devices located in the vehicle 100. For example, the RFID number determiner 124 identifies one or more RFID numbers associated with the mobile device 104 of the driver 118 and identifies one or more RFID numbers associated with the mobile device 106 of the passenger 120. Further, the RFID number determiner 124 provides at least one RFID number associated with one of the mobile devices 104, 106 to the communication module 126. The communication module 126 sends the RFID number to the RFID module 128 to enable the RFID module 128 to transmit the RFID number to a corresponding RFID reader. In the illustrated example, the RFID module 128 of the vehicle transmits an RFID number associated with the mobile device 104 and/or the mobile device 106 to an RFID reader 130 of the access point 102 to facilitate the vehicle 100 in entering a restricted area (e.g., a portion of toll road, a parking structure, etc.) through the access point 102.

Figure 2:
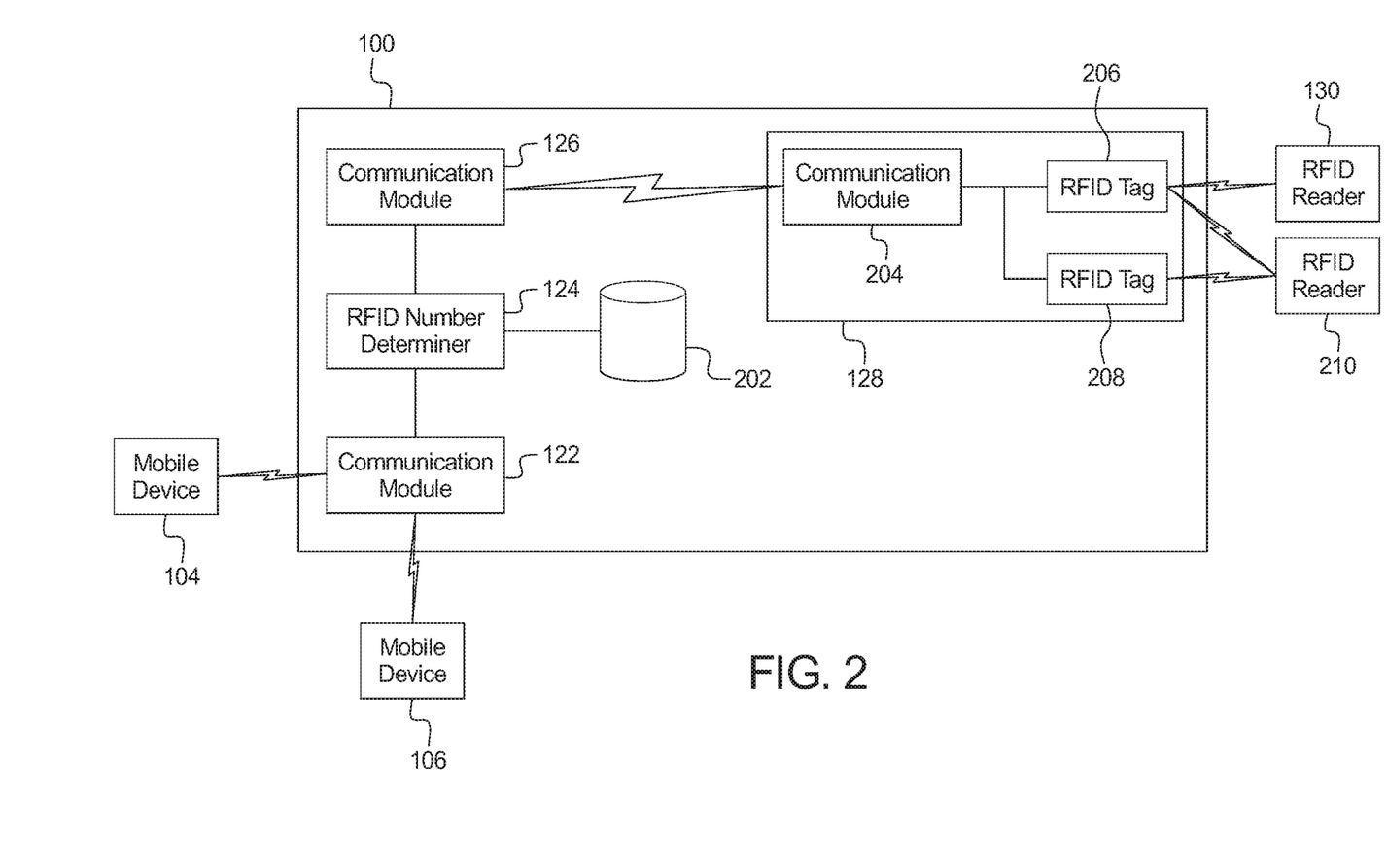
FIG. 2 is a block diagram of components of the vehicle of FIG. 1 in communication with mobile devices and RFID readers.

FIG. 2 is a block diagram of components of the vehicle 100 that enable the vehicle 100 to enter through an access point (e.g., the access point 102) of a restricted area utilizing the RFID module 128 and based on the mobile devices 104, 106 located within the vehicle 100. As illustrated in FIG. 2, the vehicle 100 includes the communication module 122, the RFID number determiner 124, the communication module 126, the RFID module 128, and an RFID database.

As illustrated in FIG. 2, the communication module 122 detects and identifies which mobile devices located within the vehicle 100. In the illustrated example, the communication module 122 detects and identifies that the mobile device 104 of the driver 118 and the mobile device 106 of the passenger 120 are located in the cabin of the vehicle 100. Further, each of the mobile devices 104, 106 may be associated with one or more RFID numbers that are transmitted via the RFID module 128 to RFID readers to permit entry through corresponding access points into restricted areas.

The RFID number determiner 124 of the illustrated example is communicatively coupled to the communication module 122 and receives identification information from the communication module 122 for the mobile devices 104, 106 identified by the communication module 122. For example, the RFID number determiner 124 receives identification information of the mobile device 104 of the driver 118 and identification information of the mobile device 106 of the passenger 120. Based on the identification information of the mobile devices 104, 106, the RFID number determiner 124 queries an RFID database 202 for RFID numbers associated with the mobile devices 104, 106.

The RFID database 202 includes one or more entries in which a mobile device is associated with an RFID number, an RFID reader, and/or a corresponding restricted area or access point. For example, each entry of the RFID database 202 identifies a mobile device, an RFID number, and an RFID reader. For each entry, the mobile device is associated with the RFID number that is transmitted to the RFID reader to enable the RFID entry to permit entry into the restricted area via the access point. In some examples, entries are added to the RFID database 202 by occupant(s) of the vehicle 100. For example, the driver 118 may enter the RFID number(s) associated with the mobile device 104 into the RFID database 202, and the passenger 120 may enter the RFID number(s) associated with the mobile device 106 into the RFID database 202. In some such examples, the driver 118 and/or the passenger 120 adds the entries into the RFID database 202 via a touch screen such as the display 112. Additionally or alternatively, the driver 118 and/or the passenger 120 audibly adds the entries into the RFID database 202 via the microphone 116. In other examples, the RFID number determiner 124 identifies the RFID numbers associated with the mobile devices 104, 106 and adds those RFID numbers into the RFID database 202.

Upon querying the RFID database 202 for RFID numbers associated with the mobile devices 104, 106, the RFID number determiner 124 identifies RFID numbers associated with the mobile devices 104, 106. For example, the RFID number determiner 124 identifies a first RFID number associated with the mobile device 104, a second RFID number associated with the mobile device 106, and a third RFID number associated with the mobile device 104. The first RFID number may enable the driver 118 to enter a restricted parking structure, the second RFID number may enable the passenger 120 to pay a toll for a toll road, and the third RFID number may enable the driver 118 to pay the toll for the toll road.

Further, as illustrated in FIG. 2, the RFID number determiner 124 is communicatively coupled to the communication module 126. The communication module receives the RFID number(s) identified by the RFID number determiner 124 and sends or transmits (e.g., via wireless or wired connections) the identified RFID number(s) to the RFID module 128.

In the illustrated example, the RFID module 128 includes a communication module 204, an RFID tag 206 (e.g., a first RFID tag), and another RFID tag 208 (e.g., a second RFID tag). The communication module 204 receives the RFID numbers associated with the mobile device 104 and/or the mobile device 106. Further, the RFID number determiner 124 and/or the RFID module 128 assigns the RFID tag 206 to transmit one RFID number and assigns the RFID tag 208 to transmit another RFID number. The RFID numbers associated with the RFID tags 206, 208 may transition and/or be changed over time (e.g., via the RFID number determiner 124 as selected by an occupant of the vehicle 100) to enable the RFID module 128 to transmit different RFID numbers over time for different occupants. For example, the RFID number transmitted by the RFID tags 206, 208 change based on the access point through which the vehicle 100 is attempting to enter and/or based on which mobile device(s) are located within the cabin of the vehicle 100.

For example, the RFID tag 206 may be assigned to transmit the first RFID number that is associated with the mobile device 106 (e.g., a first mobile device) to the RFID reader 130 that is associated with the access point 102 (e.g., a first access point) to facilitate the vehicle 100 in entering the corresponding restricted area (e.g., a first restricted area). Additionally, the RFID tag 208 may be assigned to transmit the second RFID number that is associated with the mobile device 106 (e.g., a second mobile device) to another RFID reader 210 that is associated with another access point 102 (e.g., a second access point) to facilitate the vehicle 100 in entering a corresponding restricted area (e.g., a second restricted area). Alternatively, the RFID tag 206 may be assigned to transmit the third RFID number that is associated with the mobile device 106 to the RFID reader 210. For example, based on the mobile devices detected by the communication module 122 and/or subsequent selections made by an occupant of the vehicle 100, the RFID tag 206 transitions between transmitting the first RFID number to facilitate entry through the access point 102 associated with RFID reader 130 and transmitting the third RFID number to facilitate entry through the other access point associated with the RFID reader 210. Further, while the RFID module 128 of the illustrated example includes two RFID tags, the RFID module 128 may include more or less RFID tags in other examples.

In some examples, before and/or after the RFID number determiner 124 queries the RFID database 202 for RFID numbers, the RFID number determiner 124 presents a list of mobile devices identified by the communication module 122 to occupants (e.g., the driver 118, the passenger 120, etc.). For example, the RFID number determiner 124 visually presents the list of mobile devices via the display 112 and/or audibly presents the list of mobile devices via the speaker 114. Further, the RFID number determiner 124 receives a selection of at least one of the listed of mobile device from an occupant (e.g., the driver 118, the passenger 120, etc.). For example, the RFID number determiner 124 receives the selection(s) via a touch screen such as the display 112 and/or the microphone 116. Upon receiving the selection, the RFID number determiner 124 sends only the RFID numbers associated with the selected mobile device to the RFID module 128 via the communication module 126. That is, the RFID number determiner 124 determines which RFID numbers to provide to the RFID module 128 based on which mobile devices are selected by an occupant of the vehicle 100.

For example, if the occupant selects the mobile device 104 (e.g., the first mobile device) and the mobile device 106 (e.g., the second mobile device), the RFID number determiner 124 identifies RFID number(s) associated with the mobile device 104 (e.g., the first RFID number) and RFID number(s) associated with the mobile device 106 (e.g., the second RFID number). In some such examples, the RFID tag 206 is designated to communicate the first RFID number that is associated with the mobile device 104, and the RFID tag 208 may be associated to transmit the second RFID number that is associated with the mobile device 106.

In another example in which an occupant selects only the mobile device 104 (e.g., the first mobile device), the RFID number determiner 124 identifies RFID numbers (e.g., the first RFID number and the third RFID number) associated with the mobile device 104 from the RFID database 202 and sends those RFID numbers to the RFID module 128 via the communication module 126. In some such examples, the RFID tag 206 may be designated to communicate the first RFID number that is associated with the mobile device 104, and the RFID tag 208 may be associated to transmit the third RFID number that is associated with the mobile device 104.

In examples in which a mobile device is associated with multiple RFID numbers, the RFID number determiner 124 presents (e.g., via the display 112 and/or the speaker 114) a list of RFID numbers, access points, corresponding RFID readers, and/or corresponding restricted areas associated with that mobile device. Further, the RFID number determiner 124 receives a selection of at least one of the listed RFID numbers, access points, corresponding RFID readers, and/or corresponding restricted areas from an occupant of the vehicle 100. In some examples, the RFID number determiner 124 limits a number of selected RFID numbers to not exceed a number of RFID tags included in the RFID module 128. For example, if the mobile device 104 is selected, the RFID number determiner 124 presents a list of access points associated with the mobile device 104 that includes the access point 102 (e.g., a parking structure entry) associated with the RFID reader 130 and the first RFID number and the access point (e.g., a toll booth) associated with the RFID reader 210 and the third RFID number. In some such examples, the RFID module 128 is to transmit (e.g., via the RFID tag 206) the first RFID number in response to an occupant selecting the access point 102 and/or is to transmit (e.g., via the RFID tag 208) the third RFID number in response to an occupant selecting the other access point.

Thus, the RFID number determiner 124 utilizes mobile devices located within the vehicle 100 to reduce in a number of RFID modules located within the vehicle 100 (e.g., to a single RFID module), thereby improving an ease of use of occupants within the vehicle 100 when entering through an access point vian RFID communication. Further, by facilitating selection of RFID numbers being transmitted by the RFID module 128, the RFID number determiner 124 deters multiple radio-frequency signals from being simultaneously transmitted from within the vehicle 100 to a single RFID reader.

Figure 3:
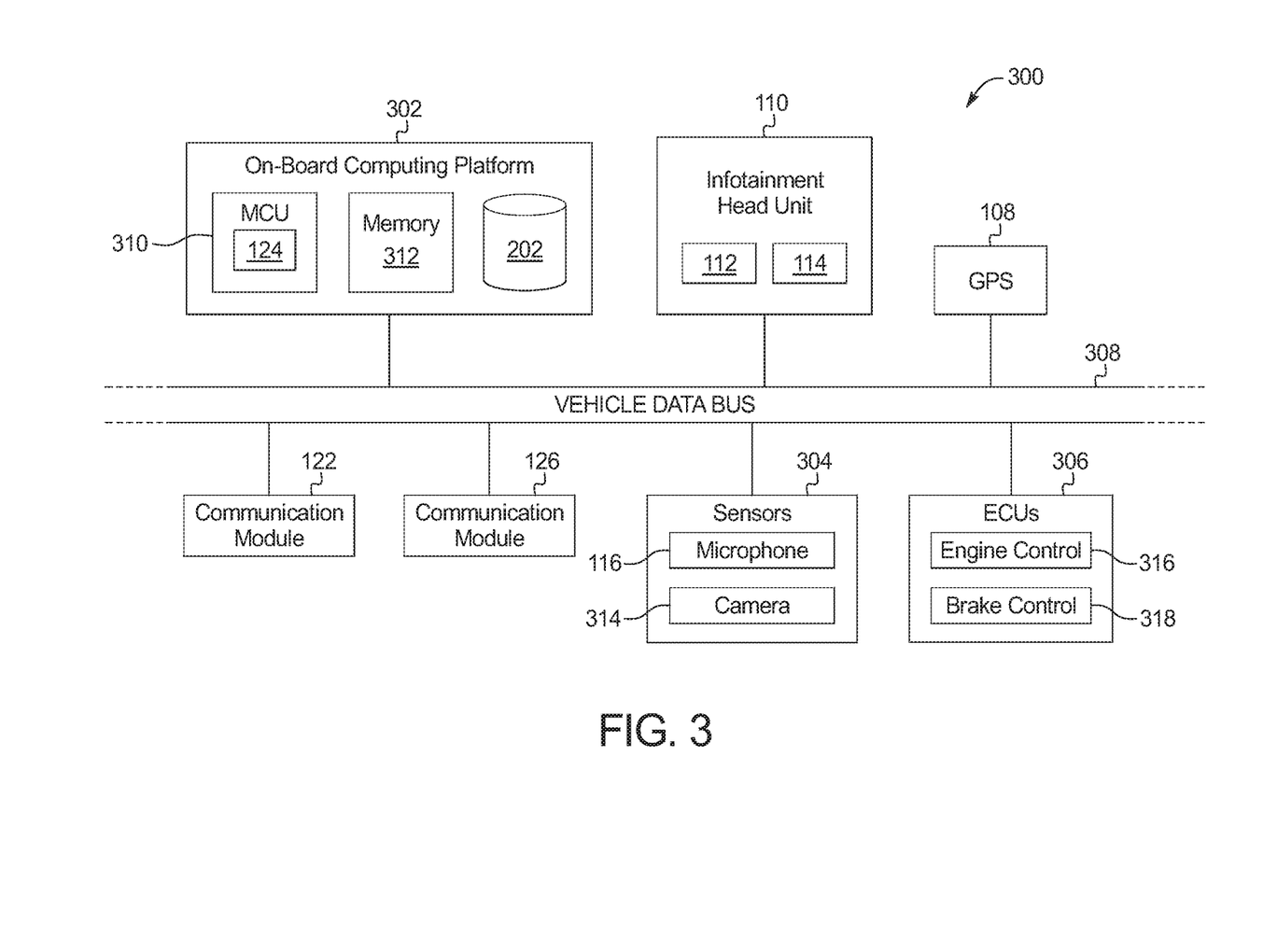
FIG. 3 is a block diagram of electronic components of the vehicle of FIG. 1.

FIG. 3 is a block diagram of electronic components 300 of the vehicle 100. As illustrated in FIG. 3, the electronic components 300 include an on-board computing platform 302, the infotainment head unit 110, the GPS receiver 108, the communication module 122, the communication module 126, sensors 304, electronic control units (ECUs) 306, and a vehicle data bus 308.

The on-board computing platform 302 includes a microcontroller unit, controller or processor 310, memory 312 and the RFID database 202. In some examples, the processor 310 of the on-board computing platform 302 is structured to include the RFID number determiner 124. Alternatively, in some examples, the RFID number determiner 124 is incorporated into another electronic control unit (ECU) with its own processor 310 and memory 312. The processor 310 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 312 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 312 includes multiple kinds of memory, particularly volatile memory and non-volatile memory.

The memory 312 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 312, the computer readable medium, and/or within the processor 310 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The sensors 304 are arranged in and around the vehicle 100 to monitor properties of the vehicle 100 and/or an environment in which the vehicle 100 is located. One or more of the sensors 304 may be mounted to measure properties around an exterior of the vehicle 100. Additionally or alternatively, one or more of the sensors 304 may be mounted inside a cabin of the vehicle 100 or in a body of the vehicle 100 (e.g., an engine compartment, wheel wells, etc.) to measure properties in an interior of the vehicle 100. For example, the sensors 304 include accelerometers, odometers, tachometers, pitch and yaw sensors, wheel speed sensors, microphones, tire pressure sensors, biometric sensors and/or sensors of any other suitable type. In the illustrated example, the sensors 304 include the microphone 116 and a camera 314. For example, the microphone 116 is utilized to collect instructions from the driver 118 and/or the passenger 120 regarding which mobile device and/or RFID number to select, and the camera 314 is utilized to detect an access point.

The ECUs 306 monitor and control the subsystems of the vehicle 100. For example, the ECUs 306 are discrete sets of electronics that include their own circuit(s) (e.g., integrated circuits, microprocessors, memory, storage, etc.) and firmware, sensors, actuators, and/or mounting hardware. The ECUs 306 communicate and exchange information via a vehicle data bus (e.g., the vehicle data bus 308). Additionally, the ECUs 306 may communicate properties (e.g., status of the ECUs 306, sensor readings, control state, error and diagnostic codes, etc.) to and/or receive requests from each other. For example, the vehicle 100 may have seventy or more of the ECUs 306 that are positioned in various locations around the vehicle 100 and are communicatively coupled by the vehicle data bus 308. In the illustrated example, the ECUs 306 include an engine control unit 316 and a brake control module 318. For example, the engine control unit 316 controls performance of an engine, and the brake control module 318 controls operation of a brake system.

The vehicle data bus 308 communicatively couples the GPS receiver 108, the infotainment head unit 110, the communication module 122, the communication module 126, the on-board computing platform 302, the sensors 304, and the ECUs 306. In some examples, the vehicle data bus 308 includes one or more data buses. The vehicle data bus 308 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 4:
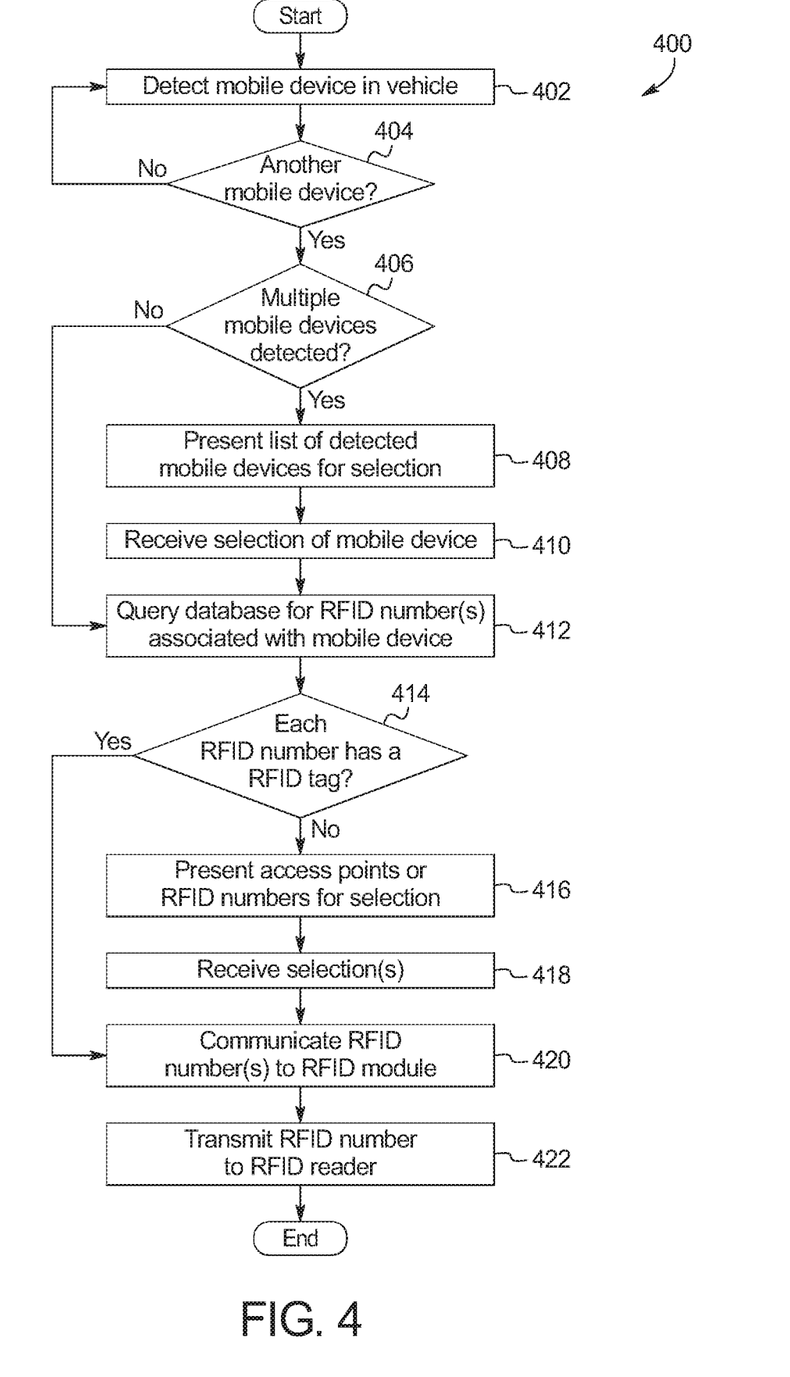
FIG. 4 is a flowchart of an example method to facilitate entry of the vehicle of FIG. 1 through access points in accordance with the teachings herein.

FIG. 4 is a flowchart of an example method 400 to facilitate entry of a vehicle through an access point via a mobile device. The flowchart of FIG. 4 is representative of machine readable instructions that are stored in memory (such as the memory 312 of FIG. 3) and include one or more programs which, when executed by a processor (such as the processor 310 of FIG. 3), cause the vehicle 100 to implement the example RFID number determiner 124 of FIGS. 1-3. While the example program is described with reference to the flowchart illustrated in FIG. 4, many other methods of implementing the example RFID number determiner 124 may alternatively be used. For example, the order of execution of the blocks may be rearranged, changed, eliminated, and/or combined to perform the method 400. Further, because the method 400 is disclosed in connection with the components of FIGS. 1-3, some functions of those components will not be described in detail below.

Initially, at block 402, the communication module 122 detects a mobile device located in the vehicle 100. For example, the communication module 122 detects and identifies that the mobile device 104 (e.g., a first mobile device) is located within a cabin of the vehicle 100. At block 404, the communication module determines whether there is another mobile device located in the vehicle 100. In response to determining that there is another mobile device, blocks 402, 404 are repeated. For example, blocks 402, 404 are repeated to detect and identify that the mobile device 106 (e.g., a second mobile device) is located in the vehicle 100.

In response to determining that there are no other mobile devices in the vehicle 100, the method 400 proceeds to block 406 at which the RFID number determiner 124 determines whether the communication module 122 detected multiple mobile devices within the vehicle 100. In response to determining that the communication module 122 detected multiple mobile devices, the RFID number determiner 124 presents a lists of detected mobile devices for selection by an occupant (e.g., the driver 118, the passenger 120) of the vehicle 100 (block 408). For example, the RFID number determiner 124 visually presents the lists of detected mobile devices via the display 112 and/or audibly presents the lists of detected mobile devices via the speaker 114. At block 410, the RFID number determiner 124 receives a selection of one or more of the mobile devices included in the list of mobile devices. For example, the RFID number determiner 124 receives the selection via a touch screen (e.g., the display 112) and/or the microphone 116.

At block 412, in response to determining at block 406 that multiple mobile devices were not detected or upon receiving the selection of the mobile device(s) at block 410, the RFID number determiner 124 queries the RFID database 202 for RFID number(s) associated with the corresponding mobile device(s). For example, if only the mobile device 104 is detected, the RFID number determiner 124 queries the RFID database 202 for RFID numbers associated with the mobile device 104 (e.g., the first RFID number, the third RFID number). Alternatively, if the mobile device 104 is selected at block 410, the RFID number determiner 124 queries the RFID database 202 for those RFID numbers associated with the mobile device 104. Additionally or alternatively, if the mobile device 106 is selected at block 410, the RFID number determiner 124 queries the RFID database 202 for RFID numbers associated with the mobile device 106 (e.g., the second RFID number).

Further, at block 414, the RFID number determiner 124 determines whether each RFID number identified at block 412 has an RFID tag of the RFID module 128. For example, the RFID number determiner 124 makes this determination by comparing a number of identified RFID numbers to a number of RFID tags within the RFID module 128. If the number of identified RFID numbers is less than or equal to the number of RFID tags, the RFID number determiner 124 determines that each RFID number does have an RFID tag at which the method 400 proceeds to block 420. Otherwise, if the number of identified RFID numbers is greater than the number of RFID tags, the RFID number determiner 124 determines that each RFID number does not have an RFID tag at which the method 400 proceeds to block 416.

At block 416, the RFID number determiner 124 presents (e.g., via the display 112 and/or the speaker 114) a list of RFID numbers, corresponding access points, corresponding RFID readers, and/or corresponding restricted areas to an occupant of the vehicle 100 for selection. For example, with respect to the mobile device 104, the RFID number determiner 124 presents a list that includes the first RFID number and the second RFID number, a list that includes the access point 102 and another access point, a list that includes the RFID reader 130 and the RFID reader 210, and or a list that includes a first restricted area (e.g., a restricted parking structure) and a second restricted area (e.g., a toll road). At block 418, the RFID number determiner 124 receives a selection from an occupant of the vehicle 100. For example, the RFID number determiner 124 limits a number of selections so that the number of RFID numbers does not exceed the number of RFID tags of the RFID module 128.

Subsequently, at block 420, the RFID number determiner 124 communicates the identified and/or selected RFID number(s) to the RFID module 128. For example, the RFID number determiner 124 communicates the RFID number(s) to the RFID module 128 via the communication module 122 of the vehicle 100 and the communication module 204 of the RFID module 128. Further, the RFID module 128 and/or the RFID number determiner 124 assigns each of the RFID number(s) to a corresponding RFID tag of the RFID module 128. For example, the first RFID module associated with the mobile device 104 is designated to be transmitted by the RFID tag 206 (e.g., a first RFID tag). Further, the second RFID module associated with the mobile device 106 and/or the third RFID module associated with the mobile device 104 is designated to be transmitted by the RFID tag 208 (e.g., the second RFID tag).

At block 422, the RFID module 128 transmits an RFID number to an RFID reader to facilitate the vehicle 100 entry of the vehicle 100 through a corresponding access point of a restricted area. For example, the RFID tag 206 transmits the first RFID number to the RFID reader 130, the RFID tag 208 transmits the second RFID number to the RFID reader 210, and/or the RFID tag 208 transmits the third RFID number to the RFID reader 210.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes,"

"including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   a communication module configured to detect a first mobile device;
   a radio frequency identification (RFID) module including one or more RFID tags; and
   a controller configured to:
      identify one or more RFID numbers associated with the first mobile device; and
      when a quantity of the one or more RFID tags equals or exceeds that of the one or more RFID numbers, assign a first RFID tag of the one or more RFID tags to transmit a corresponding first RFID number of the one or more RFID numbers associated with the first mobile device and a first RFID reader.

2. The vehicle of claim 1, further including a touchscreen that visually presents a list of mobile devices detected by the communication module and receives a selection of one of the list of mobile devices.

3. The vehicle of claim 2, further including:
   a speaker that audibly presents the list of mobile devices; and
   a microphone that receives a selection of a mobile device included within the list of mobile devices.

4. The vehicle of claim 1, wherein the RFID module includes a second RFID tag of the one or more RFID tags.

5. The vehicle of claim 4, wherein, when the quantity of the one or more RFID tags equals or exceeds that of the one or more RFID numbers, the controller is configured to assign the second RFID tag of the one or more RFID tags of the RFID module to transmit a corresponding second RFID number of the one or more RFID numbers associated with the first mobile device and a second RFID reader.

6. The vehicle of claim 5, wherein the first RFID number of the one or more RFID numbers transmitted by the first RFID tag of the one or more RFID tags and the second RFID number of the one or more RFID numbers transmitted by the second RFID tag of the one or more RFID tags are used to facilitate entry of the vehicle through different access points.

7. The vehicle of claim 1, wherein each of the one or more RFID tags of the RFID module are configured to selectively transition between transmitting different RFID numbers of the one or more RFID numbers over time to enable the RFID module to facilitate entry through different access points over time.

8. The vehicle of claim 1, wherein the communication module detects a second mobile device that different than the first mobile device.

9. The vehicle of claim 8, wherein controller is further configured to:
   identify one or more RFID numbers associated with the second mobile device; and
   when the quantity of the one or more RFID tags equals or exceeds a combined quantity of the one or more RFID numbers associated with the second mobile device and the one or more RFID numbers associated with the second mobile device, assign a second RFID tag of the one or more RFID tags of the RFID module to transmit a corresponding second RFID number of the one or more RFID numbers associated with the second mobile device.

10. The vehicle of claim 1, further including an RFID database from which the controller identifies the one or more RFID numbers associated with the first mobile device.

11. The vehicle of claim 1, further including an interface, wherein, when the quantity of the one or more RFID tags is less than the quantity of the one or more RFID numbers, the controller is further configured to to present the one or more RFID numbers identified as being associated with the first mobile device.

12. The vehicle of claim 11, wherein the interface is further configured to receive a selection of one or more of the one or more RFID numbers and the controller is further configured to assign the selected one or more of the one or more RFID numbers to a corresponding one or more of the one or more RFID tags of the RFID module for transmission.

13. The vehicle of claim 12, wherein the interface includes a touchscreen configured to:
   visually present the one or more RFID numbers associated with the mobile device; and receive the selection of the one or more RFID numbers.

14. The vehicle of claim 12, wherein the interface includes:
   a speaker to audibly present the one or more RFID numbers associated with the first mobile device; and
   a microphone to receive the selection of the one or more RFID numbers.

15. A method for entering access points, comprising:
   detecting, via a communication module, a first mobile device in a vehicle;
   identifying, via a processor, one or more radio frequency identification (RFID) RFID numbers associated with the first mobile device; and
   when a quantity of one or more RFID tags of an RFID module equals or exceeds that of the one or more RFID numbers, assigning a first RFID tag of the one or more RFID tags to transmit a corresponding first RFID number of the one or more RFID numbers associated with the first mobile device and a first RFID reader.

16. The method of claim 15, further including:
   detecting a second mobile device in the vehicle;
   identifying one or more one or more RFID numbers associated with the second mobile device; and
   when the quantity of the one or more RFID tags equals or exceeds a combined quantity of the one or more RFID numbers associated with the first mobile device and the one or more RFID numbers associated with the second mobile device, assign a second of the one or more RFID tags of the RFID module to transmit a corresponding second RFID number of the one or more RFID numbers associated with the second mobile device.

17. The method of claim 15, further including, when the quantity of the one or more RFID tags equals or exceeds that of the one or more RFID numbers, assigning a second RFID tag of the one or more RFID tags of the RFID module to transmit a corresponding second RFID number of the one or more RFID numbers associated with the first mobile device and a second RFID reader.

18. The method of claim 17, further including transmitting the first RFID number of the one or more RFID numbers via the first of the one or more RFID tags to facilitate entry through a first access point and transmitting the second RFID number of the one or more RFID numbers via the second of the one or more RFID tags to facilitate entry through a second access point different than the first access point.

19. The method of claim 15, further including selectively transitioning each of the one or more RFID tags of the RFID module between transmitting different of the one or more RFID numbers over time to enable the RFID module to facilitate entry through different access points over time.

20. The method of claim 15, further including:
- when the quantity of the one or more RFID tags is less than that of the one or more RFID numbers, presenting, via an interface, the one or more RFID numbers identified as being associated with the mobile device;
- receiving, via the interface, a selection of one or more of the one or more RFID numbers; and assigning, via the processor, the selected one or more of the one or more RFID numbers to a corresponding one or more of the one or more RFID tags of the RFID module for transmission.

* * * * *